(12) United States Patent
Nelson

(10) Patent No.: US 6,802,551 B2
(45) Date of Patent: Oct. 12, 2004

(54) THERMAL BARRIERS AND SEALS FOR CLIMATE CONTROLLED TRANSPORTATION

(76) Inventor: Chad Nelson, 2117 21st Ave., Rice Lake, WI (US) 54868

( * ) Notice: Subject to any disclaimer, the term of this patent is extended or adjusted under 35 U.S.C. 154(b) by 0 days.

(21) Appl. No.: 10/226,862

(22) Filed: Aug. 23, 2002

(65) Prior Publication Data

US 2003/0038495 A1 Feb. 27, 2003

Related U.S. Application Data

(60) Provisional application No. 60/314,885, filed on Aug. 23, 2001.

(51) Int. Cl.[7] .................................................. B60P 3/20
(52) U.S. Cl. ................ 296/24.41; 296/39.3; 296/146.8; 296/146.9; 160/113
(58) Field of Search .............................. 296/24.1, 181, 296/39.3, 50, 146.1, 146.8, 146.9, 24.41; 49/469, 475.1; 410/118; 160/327, 201, 113, 368.1, 354, 40

(56) References Cited

U.S. PATENT DOCUMENTS 4,957,301 A * 9/1990 Clay et al. ................... 277/345
6,374,567 B1 * 4/2002 Mullet ........................ 52/716.1

OTHER PUBLICATIONS

"Memtech", printed from the internet on Feb. 3, 2004, but posted on the Internet May 16, 2001.*
Excerpts from Whiting Doors website regarding a roll–up door apparatus believed to have been distributed prior to Aug. 23, 2002 (1 page).
Pages from a Todco brochure regarding a roll–up door apparatus believed to have been distributed prior to Aug. 23, 2002 (3 pages).
Access Works Inc., "Roll–Up Doors and Replacement Parts," Jan. 1997 (40 pages).

* cited by examiner

Primary Examiner—Jason Morrow
(74) Attorney, Agent, or Firm—Fish & Richardson P.C., P.A.

(57) ABSTRACT

In certain embodiments, a thermal barrier can be removably attached to portals such as trailer doors, partitions, bulkheads, and the like. In one embodiment, a flexible thermal barrier having an associated flexible seal is attached to an interior surface of a roll-up trailer door in a refrigerated trailer to insulate the cargo area from the ambient air. In other embodiments, seals mounted to the trailer wall cooperate with an insulating blanket disposed on a portal such as a roll-up door. In still other embodiments, wall mounted seals are used alone, without a blanket, to provide peripheral thermal sealing.

15 Claims, 5 Drawing Sheets

THERMAL BARRIERS AND SEALS FOR CLIMATE CONTROLLED TRANSPORTATION

CROSS-REFERENCE TO RELATED APPLICATION

This application claims the benefit of provisional patent application Ser. No. 60/314,885, filed on Aug. 23, 2001, entitled "Insulated Bulkhead and Partition Systems," by Chad Nelson, the complete disclosure of which is incorporated herein by reference.

TECHNICAL FIELD

Certain illustrative embodiments can be used in connection with the storage and transportation of cargo at controlled temperatures. Particular embodiments can provide thermal barriers and seals that reduce thermal transfer in refrigerated containers and trailers.

BACKGROUND

Perishable items such as produce and meat are often transported in refrigerated trailers, railcars, or ocean-going containers that can in turn be transported on ships, trains or trucks. Such cargo transport devices are typically equipped with a refrigeration unit which conditions the air inside the cargo space, thereby maintaining desired temperatures and humidities during transportation or storage.

Refrigerated trailers, railcars and containers can be configured so as to enclose a single, large cargo space. Their refrigeration units will accordingly maintain the entire cargo space at the same temperature and humidity unless the cargo area is somehow divided. However, when the perishable cargo does not fill the entire trailer, cooling the entire cargo area is unnecessary and costly. It causes unnecessary strain and wear on the refrigeration unit, increases fuel consumption, raises transportation costs, and lengthens the time necessary to cool the perishable cargo after any temperature aberration.

Movable partitions and bulkheads having a specialized construction which permit the cargo space of trailers, rail cars, and containers to be readily divided into sections of varying sizes are available. These bulkheads and partitions have been used on a widespread basis for separating cargo to permit multi-temperature transport. The structure and configuration of partition and bulkhead systems differ somewhat depending on whether they are being deployed in a trailer, railcar, or container.

In many applications, the cargo area adjacent the access door is kept at controlled temperature. Oftentimes such a cargo area extends from a roll-up trailer door to a bulkhead or partition wall which in turns defines another cargo area which is controlled to be at a different temperature and/or humidity. If the access door is not substantially sealed, conditioned air and/or ambient air may pass through the portal, increasing fuel consumption and causing undue strain and wear on the climate control system. In many instances, the climate control system may not be able to maintain the cargo area at the desired temperature, which in turn causes damage to or destruction of temperature sensitive cargo such as food products.

The leakage of conditioned and/or ambient air may be particularly pronounced in trailers having roll-up doors that have a construction similar to household garage doors. Roll-up doors tend to move up and down during transport, causing the associated seals to move away from their intended positions and creating gaps around the periphery of the door. Moreover, the seams between the panels of the roll-up door can also permit significant exchange of conditioned and ambient air.

However, similar problems exist with virtually any type of portal providing ingress or egress from a conditioned cargo area. Swing-type doors often have inferior insulating properties and peripheral seals. The performance of bulkheads, partitions, and any associated access doors can also be improved by improved thermal insulation and/or peripheral sealing.

SUMMARY

In certain embodiments, a thermal barrier can be removably attached to portals such as trailer doors, partitions, bulkheads, and the like. In one embodiment, a flexible thermal barrier having an associated flexible seal is attached to an interior surface of a roll-up trailer door in a refrigerated trailer to insulate the cargo area from the ambient air. In other embodiments, seals mounted to the trailer wall cooperate with an insulating blanket disposed on a portal such as a roll-up door. In still other embodiments, wall mounted seals are used alone, without a blanket, to provide peripheral thermal sealing.

DETAILED DESCRIPTION OF ILLUSTRATIVE EMBODIMENTS

Figure 1:
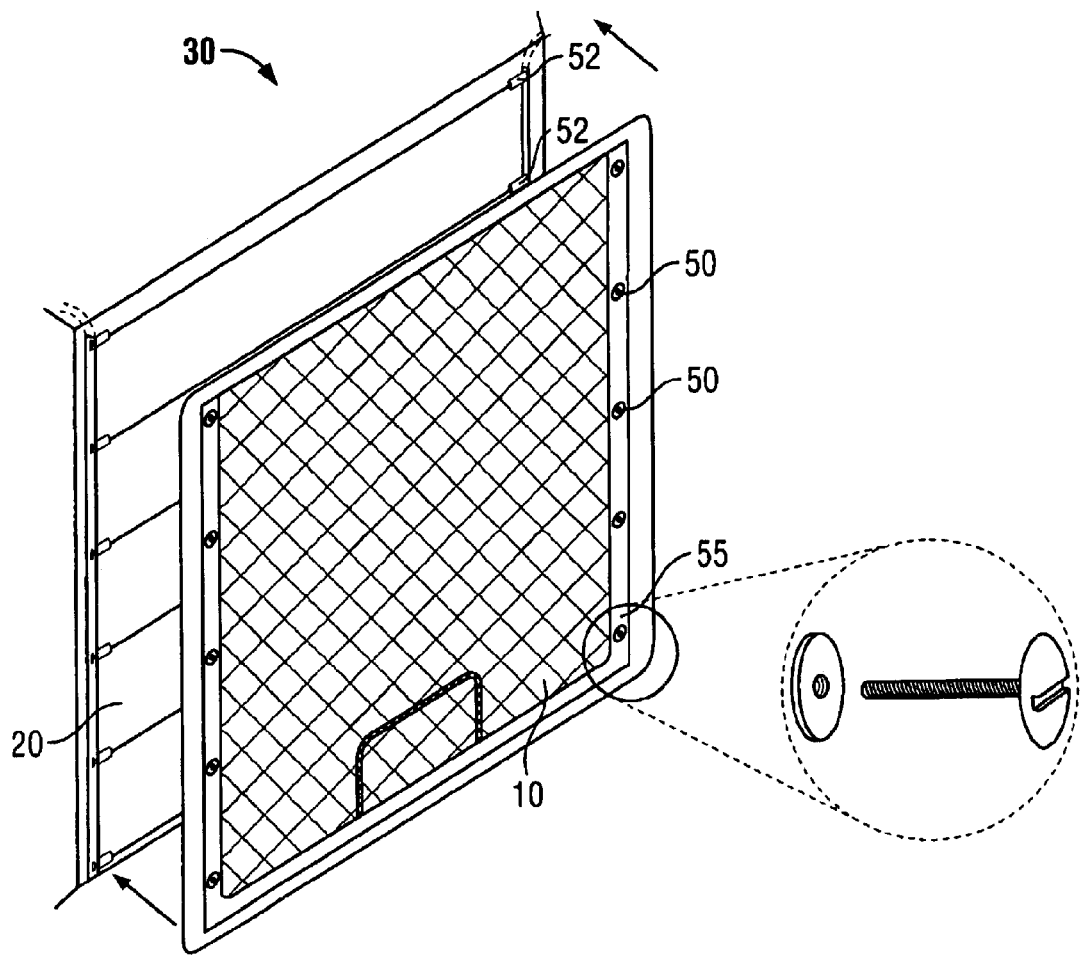
FIG. 1 is a perspective view of a thermal barrier having a laterally extending seal.

Referring to FIG. 1, a thermal barrier 10 is adapted to be mounted to a roll-up, or overhead, trailer door 20. The arrow points toward the rear of the trailer, and the cargo area 30 extends in the opposite direction. The roll-up door is mounted with roller mechanisms 52 to an arcuate track that extends along the ceiling of the trailer (not shown). The roll-up door 20 is comprised of a plurality of panels that are hinged together. Thermal barrier 10 includes apertures 50, 55 for receiving rivets, bolts or other suitable fasteners which serve to rigidly attach the barrier 10 to the roll-up door. Barrier 10 also includes a laterally extending seal flap adapted to contact the trailer wall and a body portion made of quilted fabric which encloses insulation material.

Those skilled in the art will appreciate that the thermal barrier can be similarly mounted to a wide variety of other types of cargo storing or transporting structures including, for example, a panel, movable partition, bulkhead, hinged door, or other known types of walls or compartmental structures.

In controlled temperature transport devices, a cargo area such as that depicted by area 30 is typically maintained at a desired temperature by the use of a refrigeration unit or other climate control unit. The thermal barrier impedes the passage of air through joints, gaps or seams the roll-up door 20, which in turn helps insulate cargo area 30 from the ambient air outside of the trailer. The insulating body layer of the barrier 10 also helps reduce conductance of heat through the roll-up door 20.

Figure 2:
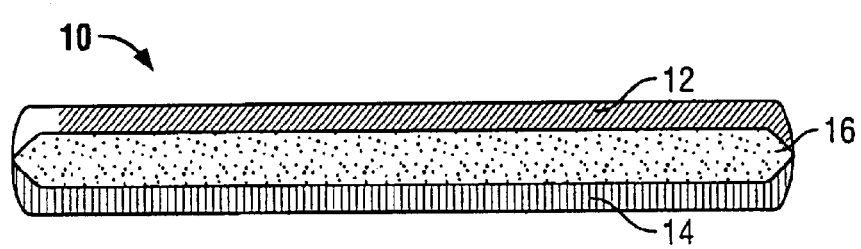
FIG. 2 is a cross-sectional view of the blanket portion of a thermal barrier.

FIG. 2 depicts an embodiment of thermal barrier 10. As seen in FIG. 2, barrier 10 has a first outer shell layer 12 and second outer shell layer 14. Alternatively, barrier 10 can be a single thermal layer. Shell layers 12 and 14 are preferably made from material that is can withstand harsh handling conditions, temperature extremes and exposure to moisture. Optionally, either layer 12 or 14, or both, can advantageously be made from lightweight material to avoid adding unnecessary weight to a cargo truck or transporting vehicle. Suitable materials for either shell layers 12 or 14 include, for example, netting, woven fabrics, plastic, nylon, and other textiles. The components of shell layers 12 or 14 are preferably non-toxic and non-irritant, yet heavy and thick enough to withstand treacherous handling and treatment, such as that which can occur during cargo storage and transport. Where fabric or textiles are used, heavy denier material is preferred. Alternatively, polymeric materials can be used. When choosing an appropriate shell material, those that have some softness, flexibility (e.g. non-rigid or semi-rigid), and/or resiliency may be advantageous, especially when barrier 10 is attached to moving structures such as a roll-up door.

Shell layers 12 and 14 can themselves be insulating materials if provided in sufficient thickness or if the textile is of heavy-gauge or density (e.g., wool). However, to provide additional thermal insulation, barrier 10 can also include fill material 16. Barrier 10 is preferably filled with a sufficient amount of thermal insulating fill material 16 to maximize temperature retention within a cargo area. Depending on the desired extent of temperature retention and other factors such as total barrier weight, the amount of fill material can be customized for a desired amount of loftiness (loft), thickness, and/or density. Loose fill material can comprise, for example, blown fibers, non-woven webs of fibers, woven fibers, feathers, wool, animal fur, foam, bits and pieces of fabric or other material, or combinations of the aforementioned. Alternatively, fill 16 can be a layer of fabric or substantially continuous web of material 19, such as that shown in FIG. 3. Fill material 16 or 19 can be made from either synthetic or natural materials.

Figure 3:
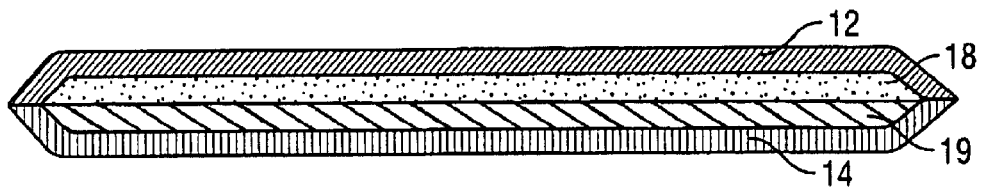
FIG. 3 is a cross-sectional view of a second blanket portion of a thermal barrier.

In another embodiment, thermal barrier 10 can be filled with layers of fill material to create a multi-layer assembly. As seen in FIG. 3, outer shell layers 12 and 14 can sandwich a substantially continuous layer 19 therebetween, as well as a second layer of loose fill material 18. Examples of substantially continuous layers include Thinsulate™, GoreTex™, foam, non-woven webs of fibers, and woven webs of fibers. optionally, additional or multiple substantially continuous layers can be added if desired. To impart stiffness to the barrier, reinforcing netting or webs can also be used along with fill material.

The thermal barrier can be flexible enough to move along with the cargo-area-defining structure (e.g., door or panel) that it is attached to.

Figure 4:
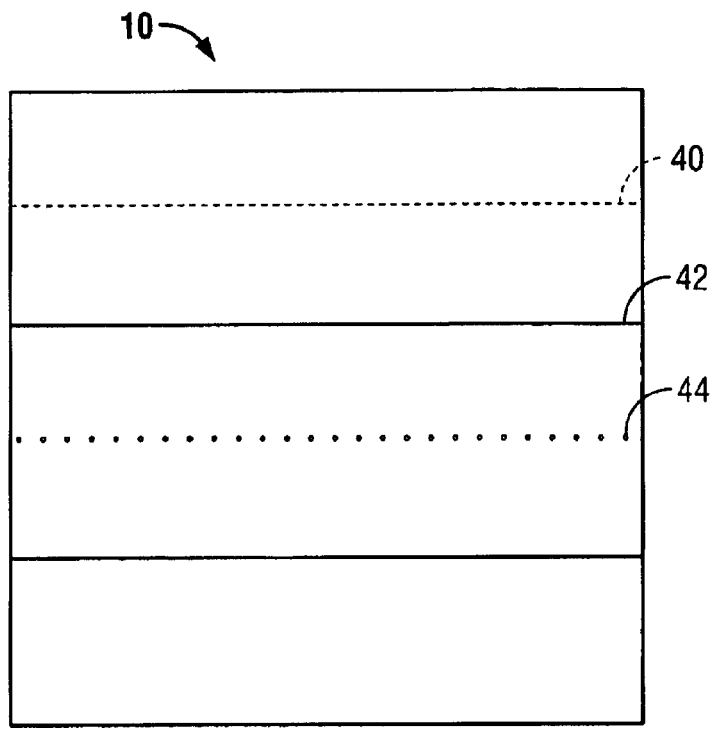
FIG. 4 is a front view of a blanket portion of a thermal barrier having horizontal stitches or seams.

In yet another embodiment, as shown in FIG. 4, baffles can be added to barrier 10 that run latitudinally across the width of barrier 10. Such baffles can be in the form of a series of perforations 40, stitched seams 42 or weld points 44, or combinations thereof. The baffles may be incorporated at longitudinal locations that correspond to each panel of the roll-up door to facilitate flex of the barrier at the appropriate locations. For structures such as a folding wall having vertical panels that fan-fold fold, vertical or longitudally running baffles could also be incorporated within barrier 10. The second purpose of baffles (40, 42, or 44) within barrier 10 is to help ensure that fill material stays in place even when subjected to gravitational forces (i.e. while the thermal barrier is hanging vertically). This may be especially advantageous when fill material is in loose form. Baffling within the barrier can be incorporated in a similar manner as what is performed in manufacturing down comforters and quilts.

Referring again to FIG. 1, thermal barrier 10 can be permanently or removably attached to door 20 using a variety of mounting means. Suitable mounting hardware accessories include, for example, fasteners, screws, bolts, staples, nails, Velcro™-type systems, adhesives, heavy-duty magnets, clamps or other hardware mounts. Alternatively, the layer may be mounted in other manners known in the art. Depending on the type of mounting system that is used, a receiving apparatus may need to be attached to door 20 to receive the mounting hardware. Mounting assemblies can be used to attach thermal barrier 10 to door 20 to allow barrier 10 to hang down over structure 20. A plurality of mounting assemblies may be located on the periphery of barrier 10, sufficient to hold the thermal barrier upright without excessive sagging or folding.

Figure 5:
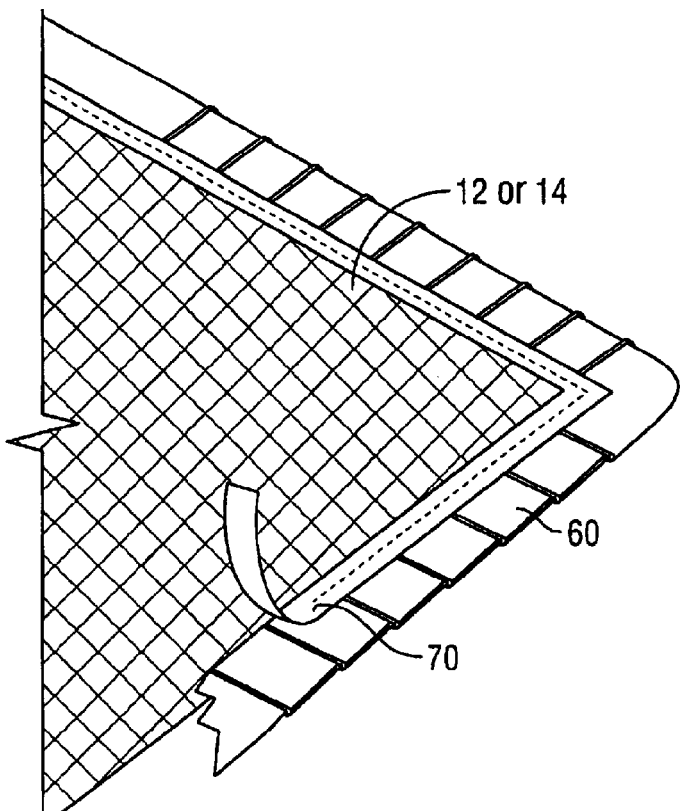
FIG. 5 is a perspective view of a portion of a thermal barrier having a laterally extending seal attached to the blanket portion with a strip of semi-rigid material.

Referring to FIG. 5, a seal 60 extends from outer shell 12 or 14. Seal 60 can extend beyond the dimensions of the door opening (and rollers, in the case of a roller-door installation) in order to minimize air flow into and out of the cargo area. Seal 60 can be an extension of shell layer 12 (i.e. the same material) or alternatively be a separate material attached to outer shell layer 12 or 14. Seal 60 may be made from a heavy-duty material that is substantially air-impermeable.

Suitable materials include, for example, polymeric materials (plastics), natural or synthetic rubber, and heavy-gauge textiles. A particularly suitable material is nylon-reinforced vinyl. Alternatively, seal 60 can be made from fiber reinforced material. Seal 60 can be shaped to resemble a fringed border or edging as shown in FIG. 5. An alternative flap design has a beveled or tapered edge to provide a better seal with the side wall of the trailer.

Optionally, a binding 70 can be used to overlay and connect shell layer 12 or 14 to seal 60. Binding 70 can connect seal 60 and shell layer 12 by a variety of methods including, for example, bonding, stitching, taping, and stapling. Alternatively, binding 70 can sandwich or pinch seal 60 between itself and outer shell layer 12 (or 14). Binding 70 can also provide "memory" to a seal 60, facilitating its return to an original position and/or shape.

In instances where the thermal barrier is mounted on a movable structure such as roll-up door or folding panels, seal 60 and binding 70 can be made from semi-rigid materials that can move and flex along with barrier 10 and structure 20.

Figure 6:
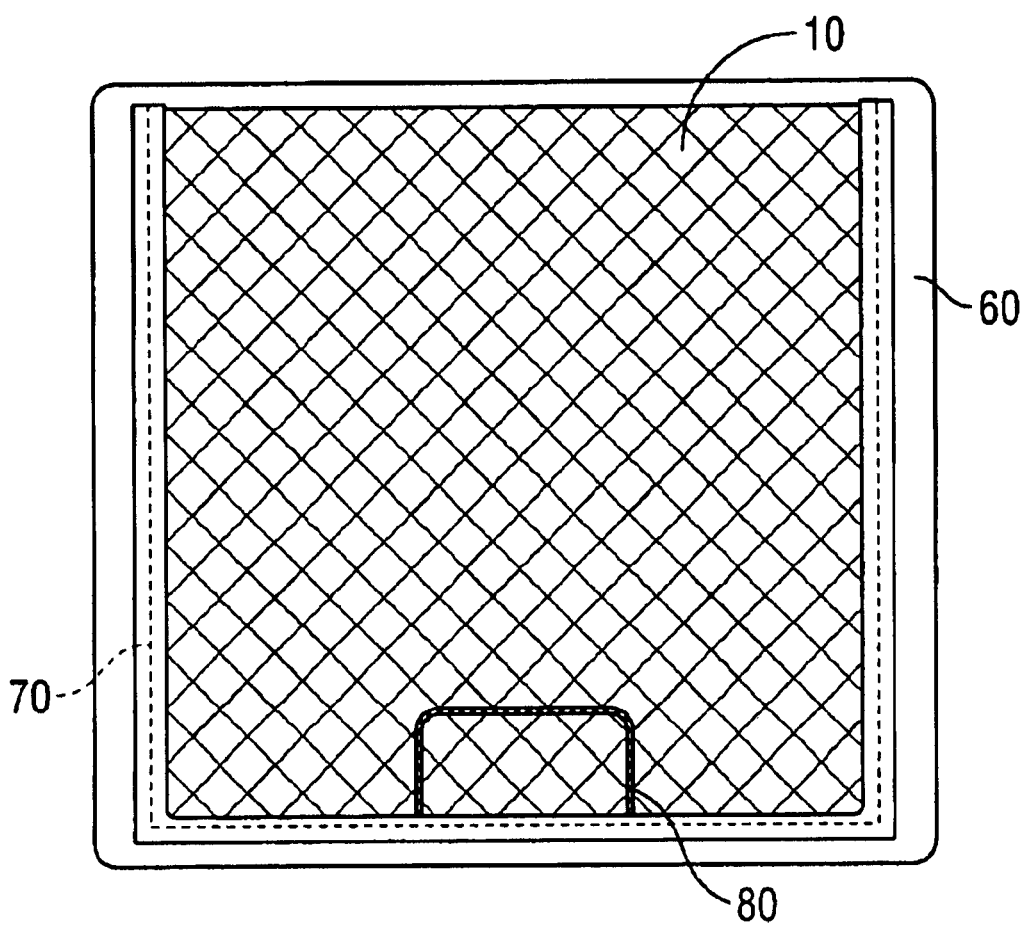
FIG. 6 is a front view of a thermal barrier having a laterally extending seal attached to the blanket portion with a strip of semi-rigid material.
Figure 7A:
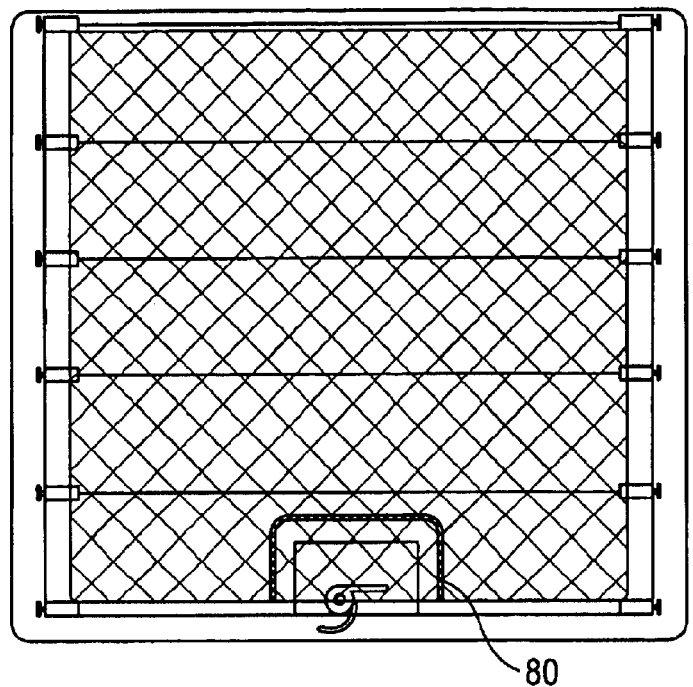
FIG. 7 includes front views of a barrier of the invention having an access flap.
Figure 7B:
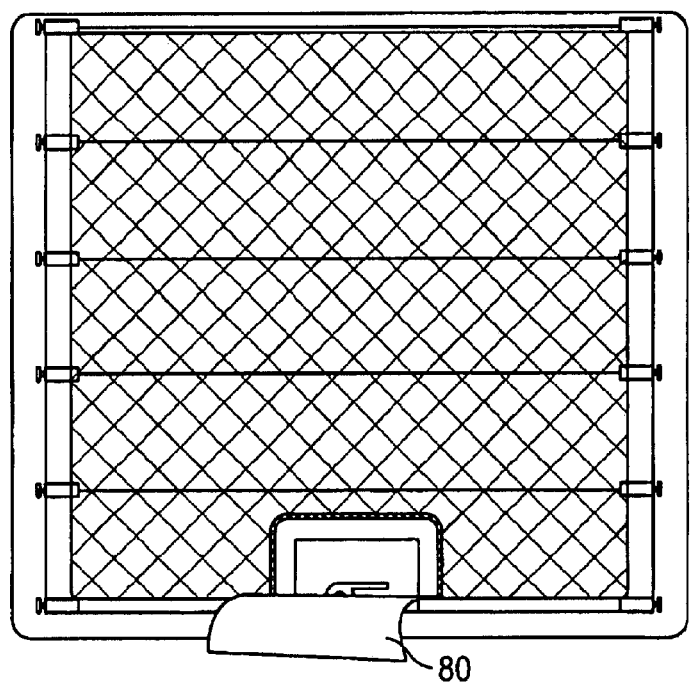

As shown in FIGS. 6 and 7, the thermal barrier can include a detachable or movable flap 80, provided to access an emergency egress handle or latch, as shown in FIGS. 6 and 7. Flap 80 may be releasably attached with, for example, snaps, fastening systems such as VELCRO™ or HOOK-N-LOOP™, a zipper, or other known fastening mechanisms.

Figure 8:
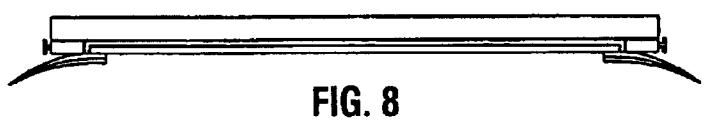
FIG. 8 is a plan view of a cross-sectional area of the barrier of FIG. 7.
Figure 9:
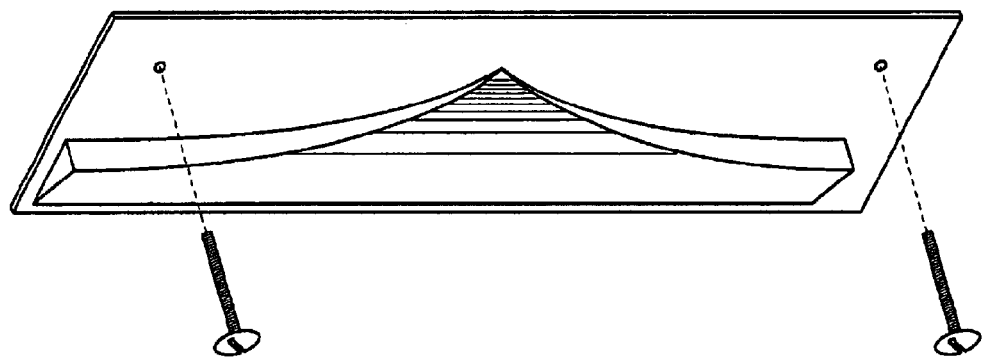
FIG. 9 includes a side view of a truck trailer having a seal setting device installed on the side wall of the trailer and a perspective view of the seal setting device.
Figure 9:
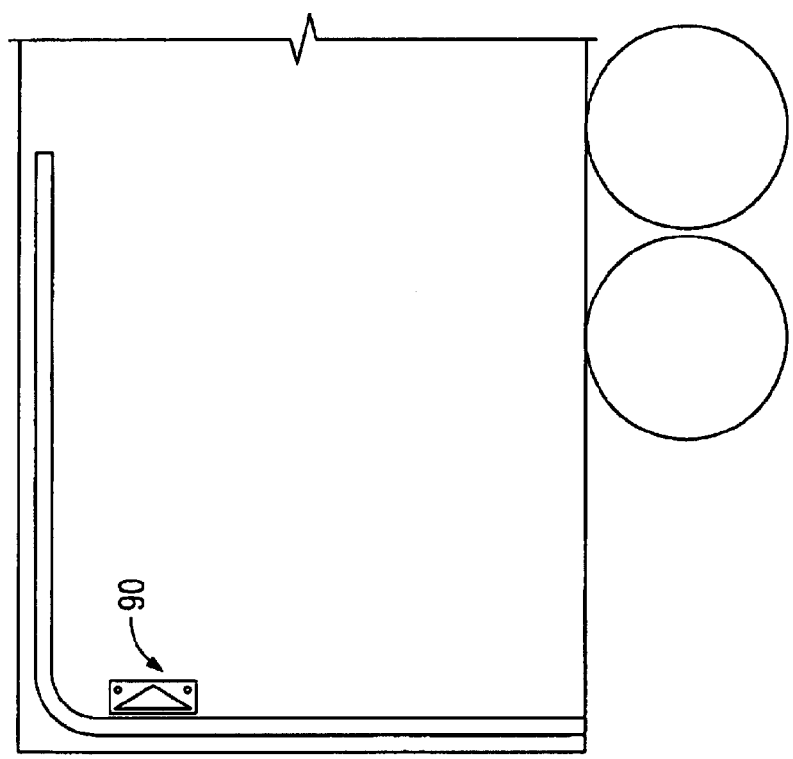

Referring to FIG. 9, a seal setter 90 is mounted on the side wall of the trailer forward of the roller track for the overhead door 20. If the flap seal 60 folds or buckles toward the rear of the trailer (i.e. toward the roll-up door), the distal end of the seal 60 will come into contact with the seal setter 90. Upon opening or closing the door 20, the seal 60 will contact and slide across the "widows peak" portion of the setter 90. The arcuate surface of the widows peak portion will tend to force the distal edge of the flap toward the front of the trailer, into the operable position depicted in FIG. 8. Various other structures can be used to prevent buckling or curling of the flap seal 60, including an thin arcuate setting member having a radius of curvature identical to the roller track and disposed immediately forward of the roller track such that a portion of the flap seal 60 is always in contact with the interior surface of the setting member. In such an embodiment, the flap 60 would slide against the interior surface of the setting member when the door 20 was opened and closed. The member would thus prevent flap 60 from curling or bending toward the rear of the trailer.

Alternatively, one or more additional, complementary seals can be added to the trailer wall which cooperate with the left, right, upper and/or lower seal members. The complimentary seals may have a similar construction, a female construction that receives the seal members 60, or other suitable configurations.

Figure 10:
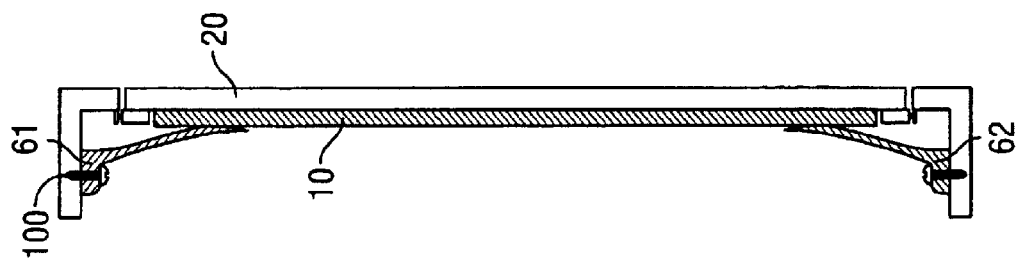
FIG. 10 is a plan view of seal member projecting from a trailer wall.

Optionally, some or all of the seal 60 can be mounted to and project from the trailer wall, as shown in FIG. 10. The left and right seal members 61, 62 mounted to the trailer walls such that they project outwardly and contact the barrier 10 at their tapered end. In such an embodiment, the left and right seal members 61, 62 can be molded such that they include a mounting flange at their base which permits attachment by riveting 100 or other known means. However, any suitable method of mechanical attachment or affixation can be used. The upper and lower seal sections may remain on the barrier 10, be omitted, or mounted to an adjacent surface.

Referring again to FIG. 10, the barrier 10 may be omitted entirely so that the distal, tapered end of the seal members 60, 62 abut and seal against the door sections 20. Here again, upper and lower seal members may be incorporated as well. A lower seal can be advantageously mounted on the lowest panel of the trailer door 20 such that its tapered end projects down and seals against the trailer floor when the door 20 is closed or nearly closed. A similar arrangement can be used to seal the upper edge of the door 20.

The seals described herein can have a variety of constructions. The seals can be constructed of any suitable material, including rubbers, composites, plastics, and other polymeric materials. The seals may include integrally molded mounting means, such as flanges, bores and the like, or may be adapted to be joined to another mounting member which is fixedly attached to a wall or the like. The seals along each edge of the portal optionally project only from the portal, wall, floor or ceiling. Alternatively, any edge of the portal may have complimentary seal members, such as where one seal member projects from a trailer wall and cooperates with and seals against another seal member that projects from the portal. The seals need not have a flexible tapered construction, but rather can have any shape or rigidity that provides, alone or in cooperation with a blanket, complimentary seal member, or other component the desired degree of peripheral sealing.

A number of embodiments of the present invention have been described. Nevertheless, it will be understood that various additional modifications may be made without departing from the spirit and scope of the invention. Accordingly, other embodiments are within the scope of the following claims.

What is claimed is:

1. An apparatus for insulating a cargo area, comprising:
   a thermal barrier adapted to be attached to a generally planar side of a portal that defines a boundary between a first set of environmental conditions and a second set of environmental conditions, the thermal barrier including a flexible insulating body portion extending over a substantial portion of the portal surface;
   at least one seal member connected to one or more peripheral edges of the thermal barrier and covering at least a plurality of peripheral edges of the portal;
   whereby the barrier and seal member inhibit transmission of conditioned or ambient air past the portal.

2. The apparatus of claim 1, wherein a seal member is fixedly attached near a peripheral edge of the thermal barrier.

3. The apparatus of claim 1, wherein the seal member is rubber or plastic.

4. The apparatus of claim 1, further comprising a complimentary seal that cooperates with the seal member to seal a peripheral edge of the portal.

5. The apparatus of claim 1, further comprising seal members at vertical and horizontal peripheral edges of the portal.

6. The apparatus of claim 1, wherein said portal is selected from the group consisting of roll-up trailer doors, swing-type trailer doors, and bulkhead ingress/egress doors.

7. The apparatus of claim 1, wherein the insulating body portion includes an insulating fill material and covers at least substantially the entire portal.

8. The apparatus of claim 1, wherein the portal may be opened and closed without detachment of the thermal barrier.

9. The apparatus of claim 1, wherein a seal member comprises a flexible flap.

10. The apparatus of claim 1, wherein the air in the cargo area is maintained at pre-selected environmental conditions.

11. An apparatus for insulating a climate-controlled trailer having an overhead door, and mounting mechanisms coupled to an interior surface of the overhead door, the apparatus comprising:

a first seal member having a proximal end mounted to a trailer wall surface adjacent a peripheral edge of the overhead door and a distal end adapted to slidably engage an interior surface of the overhead door along a substantial portion of the edge when in an operative position;

a second seal member disposed opposite the first seal member having a proximal end mounted to a trailer wall surface adjacent to an opposite peripheral edge of the overhead door and a distal end adapted to slidably engage an interior surface of the overhead door along a substantial portion of the opposite peripheral edge when in an operative position;

whereby the seal members extend across the mounting mechanisms to inhibit transmission of conditioned or ambient air past said peripheral edges.

12. The apparatus of claim 11, further comprising a thermal barrier adapted to be attached to an interior surface of the overhead door, the thermal barrier including a flexible insulating body portion extending over a substantial portion of the overhead door surface, wherein the distal ends of the seal members contact the thermal barrier when an operative position.

13. The apparatus of claim 11, wherein the seal is rubber or plastic.

14. The apparatus of claim 11, wherein the overhead door may be opened and closed without detachment of the seal members.

15. The apparatus of claim 11, wherein at least one of the first or second seal members comprises a flexible flap.

* * * * *

UNITED STATES PATENT AND TRADEMARK OFFICE
CERTIFICATE OF CORRECTION

PATENT NO. : 6,802,551 B1 Page 1 of 1
APPLICATION NO. : 10/226862
DATED : October 12, 2004
INVENTOR(S) : Nelson It is certified that error appears in the above-identified patent and that said Letters Patent is hereby corrected as shown below:

(item 56)
On Title Page, References Cited, U.S. Patent Documents, please insert --

| | | |
|---|---|---|
| 1,590,974 | 06-1926 | Hall |
| 1,704,758 | 03-1929 | Meinhardt |
| 4,366,977 | 01-1983 | Davis et al. |
| 5,010,943 | 04-1991 | Boyer |
| 5,028,087 | 07-1991 | Ells-- |

(item 56)
Title Page, References Cited, U.S. Published Patent Applications, please insert --

2002/0108725     08/2002     Nelson et al.--

Signed and Sealed this

Fifteenth Day of August, 2006

JON W. DUDAS
*Director of the United States Patent and Trademark Office*